(12) United States Patent
Ramkumar et al.

(10) Patent No.: US 10,123,224 B2
(45) Date of Patent: Nov. 6, 2018

(54) DEFENSE AGAINST FALSE DETECTION OF SEMI-PERSISTENT SCHEDULING (SPS) ACTIVATION OR RELEASE

(71) Applicant: QUALCOMM Incorporated, San Diego, CA (US)

(72) Inventors: Vasanth Kumar Ramkumar, San Diego, CA (US); Dominique Francois Bressanelli, Eschborn (DE); Brandon Allen Burdge, Boulder, CO (US); Deepak Krishnamoorthi, San Diego, CA (US); Kevin Shaokwan Wang, Sunnyvale, CA (US); Srinivasan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 14/504,569

(22) Filed: Oct. 2, 2014

(65) Prior Publication Data

US 2015/0098341 A1    Apr. 9, 2015

Related U.S. Application Data

(60) Provisional application No. 61/887,331, filed on Oct. 4, 2013.

(51) Int. Cl.
*H04W 24/08*    (2009.01)
*H04J 11/00*    (2006.01)
(Continued)

(52) U.S. Cl.
CPC ......... *H04W 24/08* (2013.01); *H04J 11/0079* (2013.01); *H04L 1/20* (2013.01); *H04W 72/08* (2013.01)

(58) Field of Classification Search
CPC ... H04W 24/08; H04W 72/042; H04W 72/08; H04J 11/0079; H04L 1/20
(Continued)

(56) References Cited

U.S. PATENT DOCUMENTS

2009/0257385 A1* 10/2009 Meylan ................. H04L 1/0045
370/329
2010/0220816 A1*  9/2010 Walker ................. H04L 27/3488
375/316
(Continued)

FOREIGN PATENT DOCUMENTS

| EP | 2654358 A1 | 10/2013 |
| WO | WO-2008084922 A1 | 7/2008 |
| WO | WO-2012079517 A1 | 6/2012 |

OTHER PUBLICATIONS

International Search Report and Written Opinion—PCT/US2014/058964—ISA/EPO—dated Jan. 21, 2015.
(Continued)

*Primary Examiner* — Charles C Jiang
*Assistant Examiner* — Walli Butt
(74) *Attorney, Agent, or Firm* — Patterson & Sheridan, LLP

(57) ABSTRACT

Certain aspects of the present disclosure provide techniques for defending against false semi-persistent scheduling (SPS) activation detection and/or missed SPS release. According to certain aspects, a user equipment (UE) may detect one or more conditions for a semi-persistent scheduling (SPS) activation or release are met based on a downlink transmission, generate one or more metrics related to downlink transmission, and determine a valid SPS activation or release has occurred if the one or more metrics satisfy one or more criteria. According to certain aspects, a UE may determine a valid semi-persistent scheduling (SPS) activa-
(Continued)

tion has occurred, detect a number of PDSCH CRC failures, and implicitly declare an SPS release based on the detection.

18 Claims, 7 Drawing Sheets

(51) Int. Cl.
 *H04L 1/20* (2006.01)
 *H04W 72/08* (2009.01)
(58) Field of Classification Search
 USPC ......... 370/242, 252, 329; 375/316; 455/450; 714/748, 807
 See application file for complete search history.

(56) References Cited

U.S. PATENT DOCUMENTS

| 2011/0083066 | A1* | 4/2011 | Chung | ................. | H03M 13/09 |
| | | | | | 714/807 |
| 2011/0223924 | A1* | 9/2011 | Lohr | ................. | H04W 72/042 |
| | | | | | 455/450 |
| 2014/0219131 | A1* | 8/2014 | Yang | ................. | H04W 24/10 |
| | | | | | 370/252 |

OTHER PUBLICATIONS

3rd Generation Partnership Project Technical Specification Group Radio Access Network; Evolved Universal Terrestrial Radio Access (E-UTRA); Physical layer procedures (Release 11) 3GPP Draft; DRAFT36213-B40, 3rd Generation Partnership Project (3GPP), Mobile Competence Centre ; 650, Route Des Lucioles ; F-06921 Sophia-Antipolis Cedex ; France, Sep. 18, 2013, 183 Pages, XP050715990, Retrieved from the Internet: URL:http://www.3gpp.org/ftpjtsg ran/WG1 RL1/DRAFT/.

NTT Docomo, Inc., "Handling of False Detection of Semi-Persistent PDCCH", 3GPP Draft; R2-082479, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; 20080428, Apr. 28, 2008, 3 Pages, XP050140163.

Qualcomm Europe: Release of Semi-Persistent Resources 11, 3GPP Draft; R2-082500 Release of SPS, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; Apr. 29, 2008, 2 Pages, XP050140182.

\* cited by examiner

DEFENSE AGAINST FALSE DETECTION OF SEMI-PERSISTENT SCHEDULING (SPS) ACTIVATION OR RELEASE

CLAIM OF PRIORITY UNDER 35 U.S.C. § 119

The present Application for Patent claims priority to U.S. Provisional Application No. 61/887,331, entitled, "Defense Against False Detection of Semi-Persistent-Scheduling (SPS) Activation or Release," filed Oct. 4, 2013, and assigned to the assignee hereof and expressly incorporated herein by reference.

BACKGROUND

I. Field

The present disclosure relates generally to taking action to defend against scenarios that result in false detection of semi-persistent-scheduling (SPS) activation or release.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Various reference signals (RSs), known to the UEs, may be transmitted in the downlink, for example, to facilitate channel estimation. In some cases, cell-specific RSs are provided, which are common to all UEs in a cell. In addition, UE-specific RSs may also be transmitted, embedded in data targeting specific UEs. Further, Multimedia Broadcast Single Frequency Network (MBSFN)-specific RSs may also be provided in case of MBSFN configurations. These RSs typically occupy specified Resource Elements (REs) within an Orthogonal Frequency Division Multiplexed (OFDM) symbol.

SUMMARY

Certain aspects of the present disclosure provide a method for wireless communications by a user equipment (UE). The method generally includes detecting one or more conditions for a semi-persistent scheduling (SPS) activation or release are met based on a downlink transmission, generating one or more metrics related to downlink transmission, and determining a valid SPS activation or release has occurred if the one or more metrics satisfy one or more criteria.

Certain aspects of the present disclosure provide an apparatus for wireless communications. The apparatus generally includes at least one processor configured to detect one or more conditions for a semi-persistent scheduling (SPS) activation or release are met based on a downlink transmission, generate one or more metrics related to downlink transmission, and determine a valid SPS activation or release has occurred if the one or more metrics satisfy one or more criteria, and a memory coupled with the at least one processor.

Certain aspects of the present disclosure provide an apparatus for wireless communications. The apparatus generally includes means for detecting one or more conditions for a semi-persistent scheduling (SPS) activation or release are met based on a downlink transmission, means for generating one or more metrics related to downlink transmission, and means for determining a valid SPS activation or release has occurred if the one or more metrics satisfy one or more criteria.

Certain aspects of the present disclosure provide a computer-readable medium for wireless communications by a user equipment (UE). The computer-readable medium generally includes instructions for detecting one or more conditions for a semi-persistent scheduling (SPS) activation or release are met based on a downlink transmission, generating one or more metrics related to downlink transmission, and determining a valid SPS activation or release has occurred if the one or more metrics satisfy one or more criteria.

Certain aspects of the present disclosure provide a method for wireless communications by a user equipment (UE). The method generally includes determining a valid semi-persistent scheduling (SPS) activation has occurred, detecting a number of physical downlink shared channel (PDSCH) CRC failures, and implicitly declaring an SPS release based on the detection.

Certain aspects of the present disclosure provide an apparatus for wireless communications. The apparatus generally includes at least one processor configured to determine a valid semi-persistent scheduling (SPS) activation has occurred, detect a number of PDSCH CRC failures, and implicitly declare an SPS release based on the detection.

Certain aspects of the present disclosure provide an apparatus for wireless communications. The apparatus generally includes means for determining a valid semi-persistent scheduling (SPS) activation has occurred, means for detecting a number of PDSCH CRC failures, and means for implicitly declaring an SPS release based on the detection.

Certain aspects of the present disclosure provide a computer-readable medium for wireless communications. The computer-readable medium generally includes instructions for determining a valid semi-persistent scheduling (SPS) activation has occurred, detecting a number of PDSCH CRC failures, and implicitly declaring an SPS release based on the detection.

DETAILED DESCRIPTION

Certain aspects of the present disclosure provide techniques for defending against adverse effects that may be caused by a user equipment (UE) falsely detecting SPS activation or release. For example, the techniques may help a UE avoid falsely detecting a positive SPS download (DL) activation, which might lead to unnecessary DL decoding attempts. As another example, the techniques may help a UE avoid missing an SPS release or, in some cases, allow the UE to implicitly release when an SPS release is missed.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
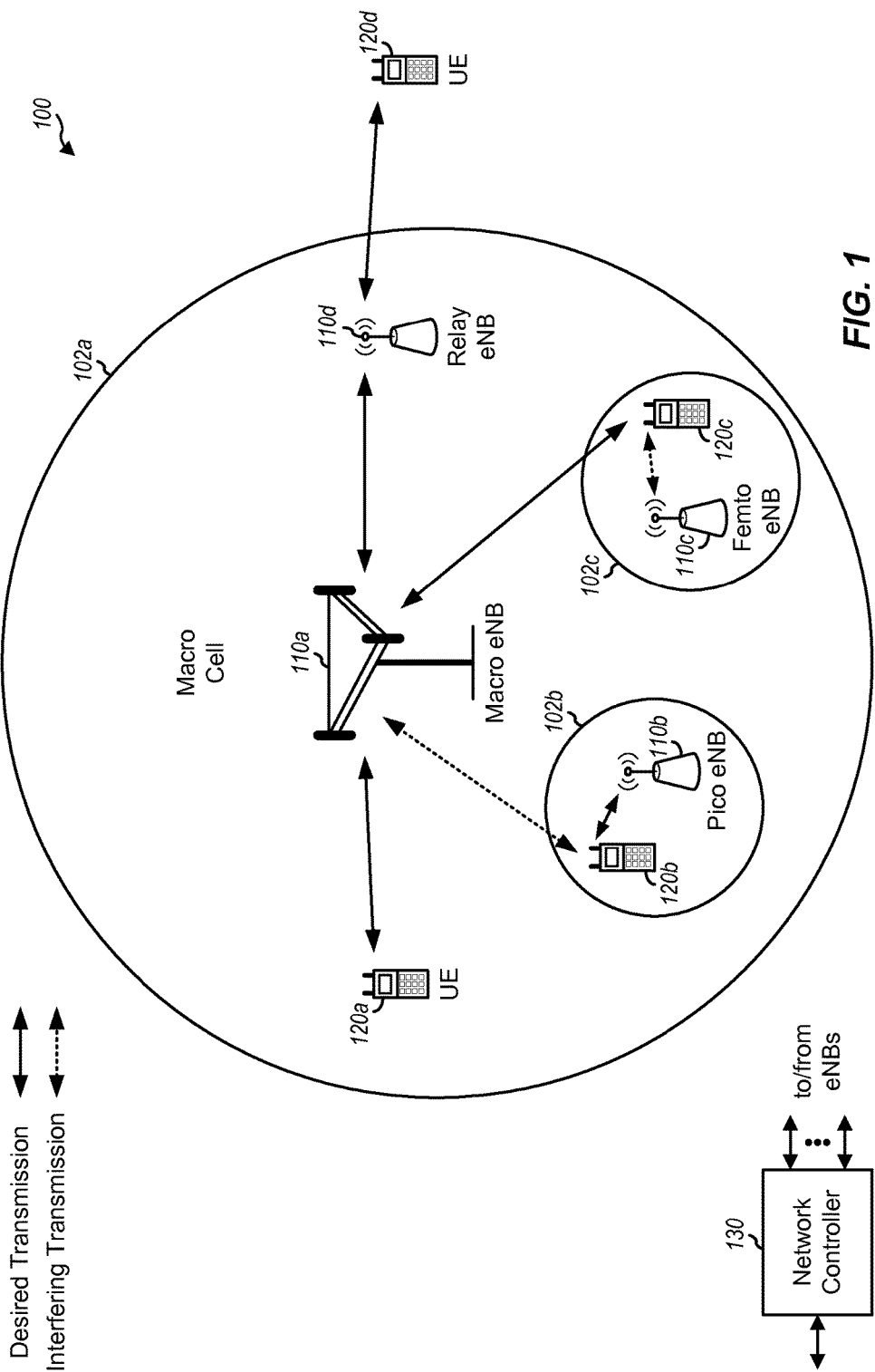
FIG. 1 shows a wireless communication network.

FIG. 1 shows a wireless communication network 100 in which techniques of the present disclosure may be practiced. For example, UEs 120 shown in FIG. 1 may utilize techniques described herein for defending against scenarios that result in false detection of semi-persistent-scheduling (SPS) activation or release.

According to certain aspects, wireless communication network 100 may be an LTE network or some other wireless network. Wireless communications network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless communications network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless communications network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communications network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless communications network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. According to certain aspects, a UE 120 may perform certain techniques for defending against adverse effects that may be caused by the UE falsely detecting SPS activation or release. In one example, in order to avoid falsely detecting SPS activation or release, a UE 120 may detect one or more conditions for a semi-persistent scheduling (SPS) activation or release are met based on a downlink transmission. The UE 120 may then generate one or more metrics related to downlink transmission and may determine a valid SPS activation or release has occurred if the one or more metrics satisfy one or more criteria. In another example, a UE 120 may determine a valid semi-persistent scheduling (SPS) activation has occurred. The UE 120 may then detect a number of Physical Downlink Shared Control Channel (PDSCH) Cyclic Redundancy Check (CRC) failures and implicitly declare an SPS release based on the detection.

Figure 2:
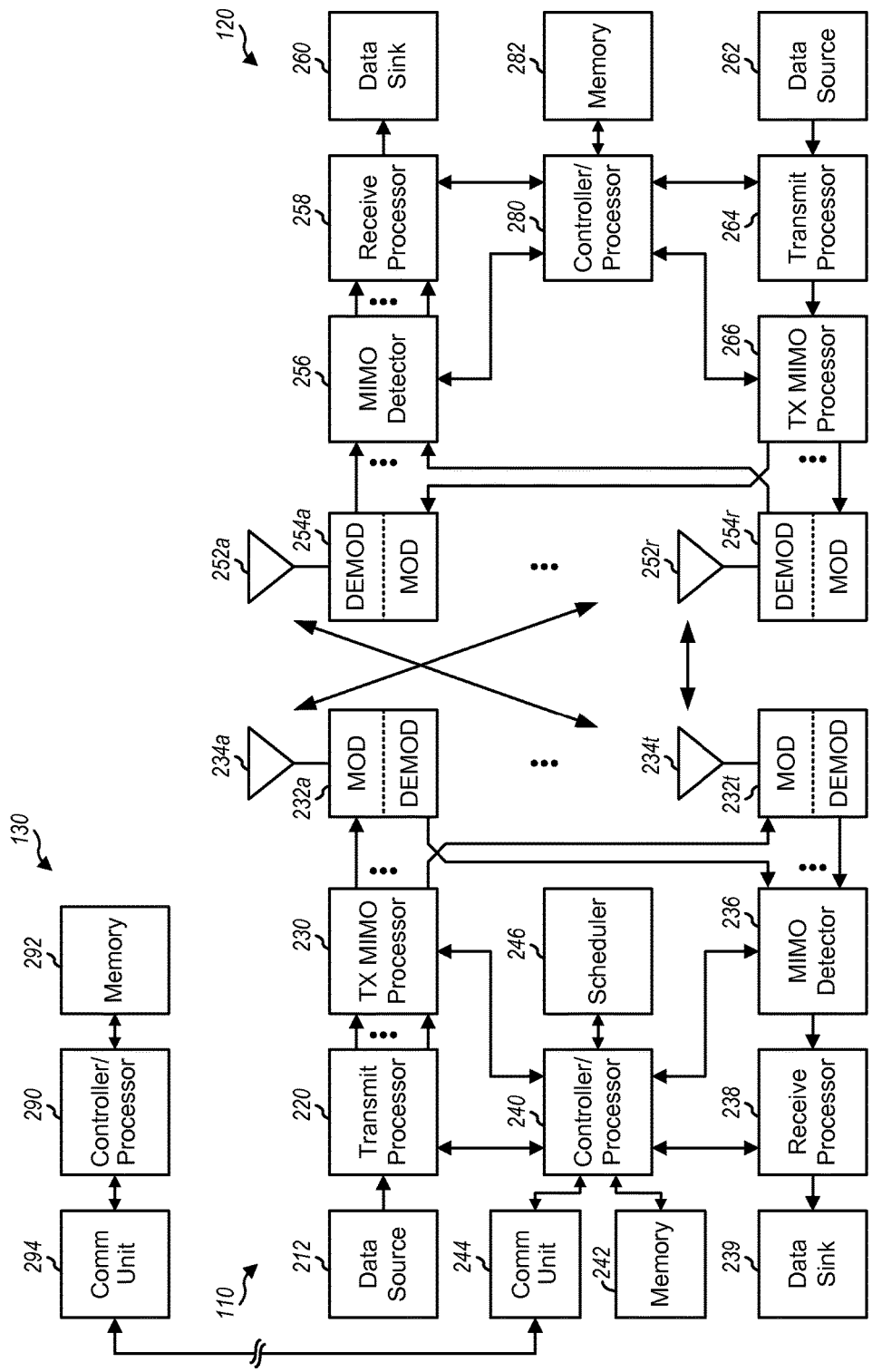
FIG. 2 shows a block diagram of a base station and a UE.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel-quality indicators (CQIs) received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. In accordance with certain aspects of the present disclosure, controller/processor 280 may be configured to perform operations described herein. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 280 and/or other processors and modules at UE 120 may perform or direct operations 600 and/or 700 of FIGS. 6 and 7, and/or other processes for the techniques described herein. Memories 242 and 282 may store data and program codes for base station 110 and UE 120, respectively. A scheduler 244 may schedule UEs for data transmission on the downlink and/or uplink.

Figure 3:
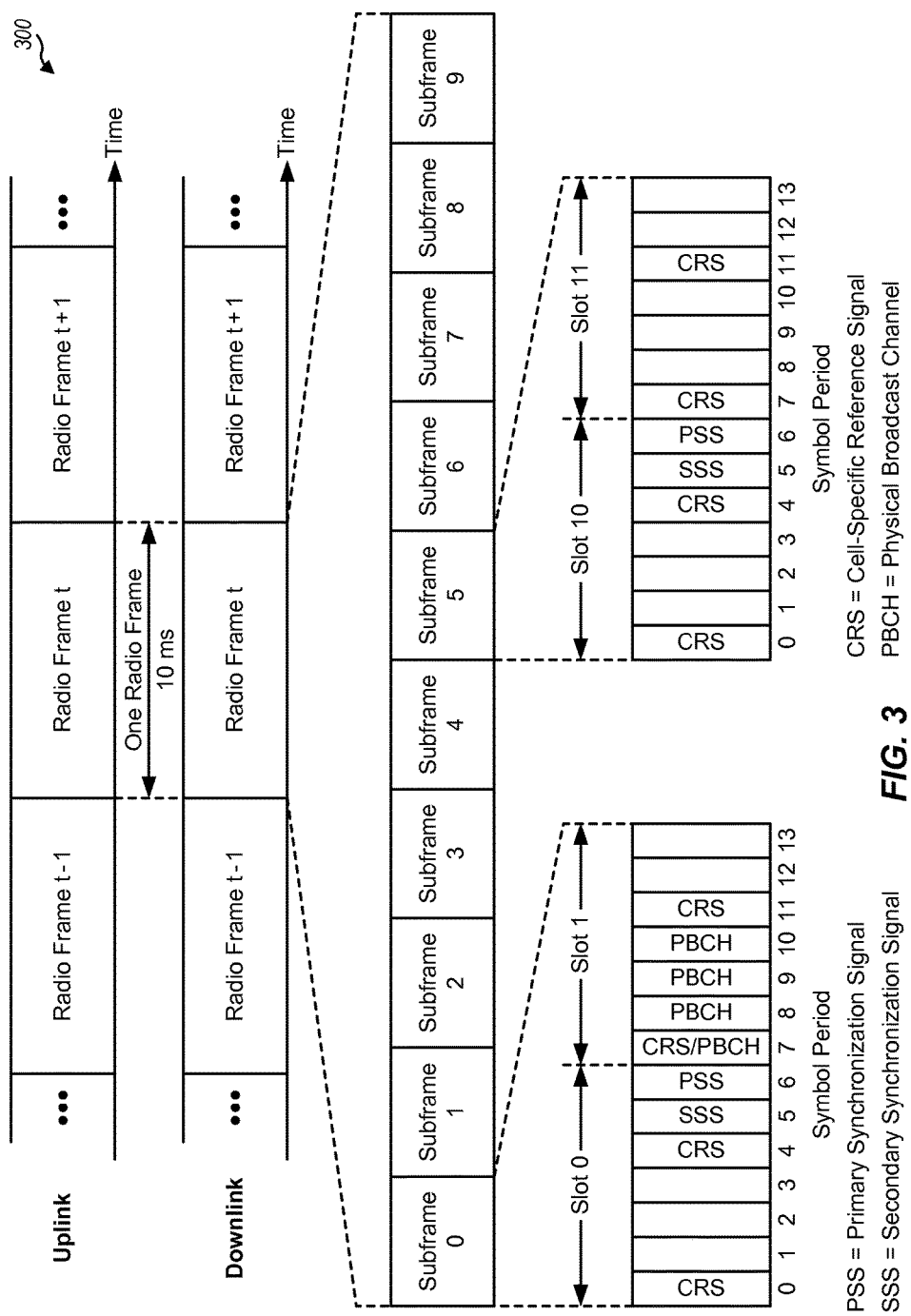
FIG. 3 shows an example frame structure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a PSS and a SSS on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB.

The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

The eNB may schedule UEs using various scheduling mechanisms. One such mechanism is referred to as semi-persistent-scheduling (SPS). When an eNB schedules a UE with SPS, the eNB may allocate resources at once and lets the UE use these resources instead of allocating the resources more periodically. In other words, an eNB may assign a predefined amount of resources to a UE with a certain periodicity. Therefore, the UE is not required to request resources during each transmission time interval (TTI), thus saving control plan overhead at the eNB. When scheduled semi-persistently, the UE may need to monitor a physical downlink control channel in every subframe since the eNB may activate/re-activate/release SPS at any time using downlink control information (DCI). However, in some scenarios (e.g., when the UE is experiencing interference), the UE may falsely detect an SPS activation or release, leading to a waste of resources. Thus, aspects of the present disclosure may help the UE determine whether an actual SPS activation or release has occurred, thereby alleviating the problem of wasted resources due to a false detection of an SPS activation or release. That is, aspects of the present disclosure provide techniques for defending against falsely detecting SPS activation or release.

Figure 4:
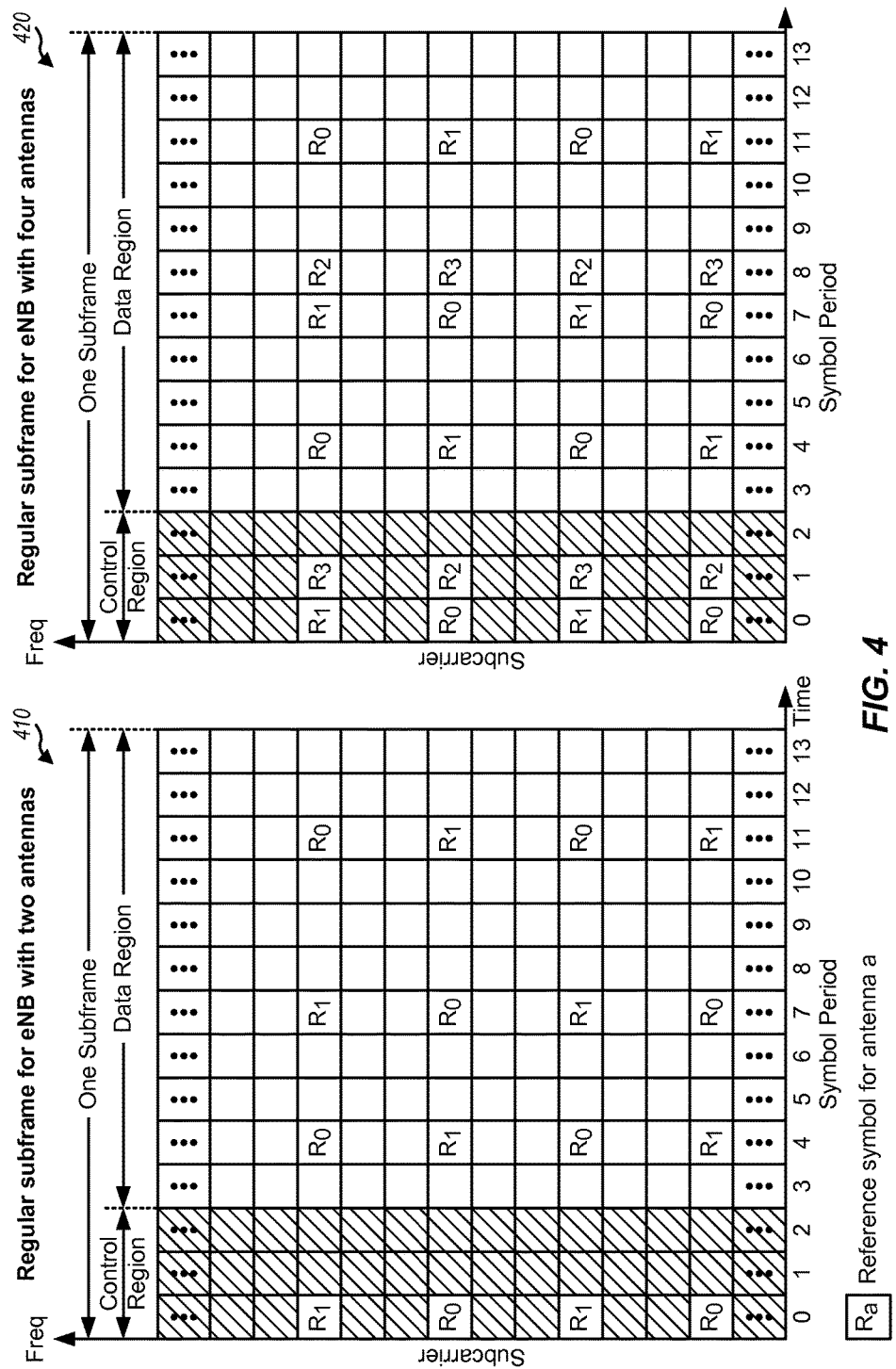
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs, which may lead to false SPS detection or release.

Example Techniques to Defend Against False Detection of SPS Activation or Release As noted above, certain aspects of the present disclosure provide techniques for defending against adverse effects that may be caused by a user equipment (UE) falsely detecting positive SPS activation or missing an SPS release.

SPS generally enables radio resources to be semi-statically configured and allocated to a UE for a time period longer than one subframe. In this manner, SPS may reduce overhead by avoiding the need for specific downlink assignment messages or uplink grant messages over the Physical Downlink Control Cannel (PDCCH) for each subframe. SPS may be useful, for example, where the timing and amount of radio resources needed are predictable.

An SPS Cell-Radio Network Temporary Identifier (SPS C-RNTI) is an identifier of the scheduling messages transmitted on the Physical Downlink Control CHannel (PDCCH) for semi-persistently scheduled Physical Downlink Shared Channel (PDSCH) data transmissions. The SPS C-RNTI allows the UE to differentiate these messages from those used for dynamic scheduling messages identified by Cell-Radio Network Temporary Identifier (C-RNTI). SPS C-RNTI is typically transmitted as a scrambling code applied to the Cyclic Redundancy Check (CRC) of the PDCCH transmission.

False detection of PDCCH for SPS DL activation or release may result in a number of problems. False detection of SPS-UL activation may be addressed via implicit release SPS by a base station after some number ('x') of consecutive empty transmissions in SPS UL (indicating the UE did not detect the activation).

A false detection of a positive SPS activation Payload (meaning the UE falsely declares an activation is detected when one was not transmitted) or a missing DCI for SPS release could cause the UE to schedule wasteful DL decoding attempts on SPS-C-RNTI, leading to unnecessary battery consumption. This scenario may continue until the network schedules a genuine activation payload. Unfortunately, due to a mis-detected grant, the network may not be expecting UL acknowledgement/negative acknowledgements (ACK/NAKs) on a physical uplink control channel (PUCCH) resource and, as a result, may not detect a problem, thereby delaying the time to correct.

Aspects of the present disclosure provide techniques that may help address this scenario. In general, the techniques may involve taking additional measures by a UE after detecting conditions are met that typically result in declaring a valid SPS activation or release (e.g., that CRC parity bits obtained for a PDCCH payload are scrambled with SPS C-RNTI and a new data indicator field is set to 0 per 3GPP 36.213 Section 9.2).

According to certain aspects, the additional measures may include utilizing a decoding quality metric before declaring a valid SPS activation or release. Examples of decoding quality metrics that may be utilized include, but are not limited to, logarithm of the likelihood ratio (LLR) energy metrics, hamming distance, or some other divergence or normalized metrics that indicate an aggregate quality of a relation between decoded bits and input soft bits. According to certain aspects, even if the conditions for an SPS activation or release are met, the UE generates a decoding quality metric for the detection. The decoding quality metric may, for example, give an indication of a probability the detected conditions really correspond to an SPS activation or release—or if the conditions were falsely detected. According to certain aspects, if the decoding quality metric is above a threshold value, the UE may declare a valid SPS activation or release is detected. If the decoding quality metric is not above the threshold level, the likelihood of false detection is higher and the corresponding grant may be discarded (or pruned). Thus, the UE may not determine an SPS activation or release to have been detected if the decoding quality metric is below a threshold value.

In some cases, a UE may implement a comparison rule to check for false C-RNTI detection when an SPS-Activation/Release is sent. In this case, since the UE will decode only grants scrambled with C-RNTI in the event of a collision, such a comparison rule may be used to eliminate a C-RNTI/SPS-C-RNTI grant with a lower decoding quality metric and/or symbol error rate (SER). In this case, the UE may help guard against a mis-detected C-RNTI grant if a lower decoding quality metric or SER is detected (e.g., relative to another grant in the same subframe).

According to certain aspects, the additional measures may include measures that may help a UE escape a cycle (of needless decoding attempts) in the event that the UE does falsely detect an SPS activation or misses an SPS release. For example, a false positive SPS activation may be suspected in the event of PDSCH CRC failures on some number of consecutive SPS-DL grants whose normalized PDSCH symbol energy is lower than the passing ones. Upon detecting this case, a UE may implicitly decide to release the SPS allocation. In some cases, the UE may perform additional checks, for example, which can compare reference signal receive power (RSRP) and/or reference signal receive quality (RSRP/RSRQ) and C-RNTI (if any) decode success rate. The underlying assumption with these operations is that any continuous CRC failures on SPS-C-RNTI (that is not seen on C-RNTI) under good channel conditions may be due to mis-detected activation or faulty network behavior (e.g., in not scheduling DL on SP S-C-RNTI).

Such an implicit release may also help address the case of missing a DCI for SPS release (and in the event that the network does not reschedule the release immediately), which may also lead to consecutive DL CRC failures. Utilizing such an approach may be applicable for TDD, since a NACK generated for SPS may also affect genuine C-RNTI scheduling, due to ACK/NACK bundling.

Figure 5:
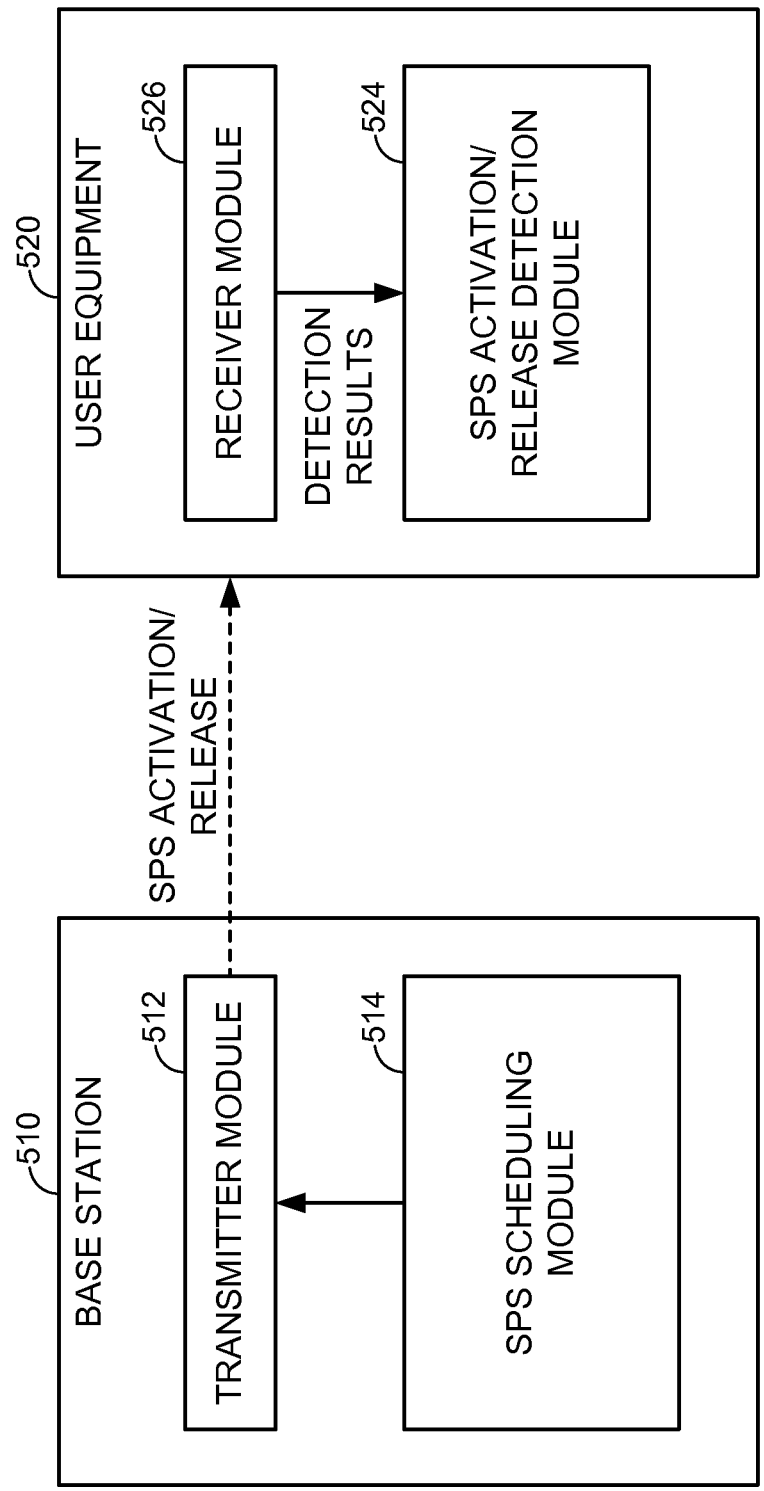
FIG. 5 shows an exemplary base station and user equipment, in accordance with certain aspects of the present disclosure.

FIG. 5 illustrates an example system in which a UE 520 may operate in accordance with aspects of the present disclosure. As illustrated, a base station 510 (e.g., an eNodeB) may have an SPS scheduling module 514 configured to signal (e.g., via properly scrambled PDCCH payload) SPS activation or release via a transmitter module 512. The UE 520 may receive transmission from the BS, via a receiver module 526, and an SPS activation/release detection module 524 may apply the techniques described above to defend against false SPS release/activation detection.

Figure 6:
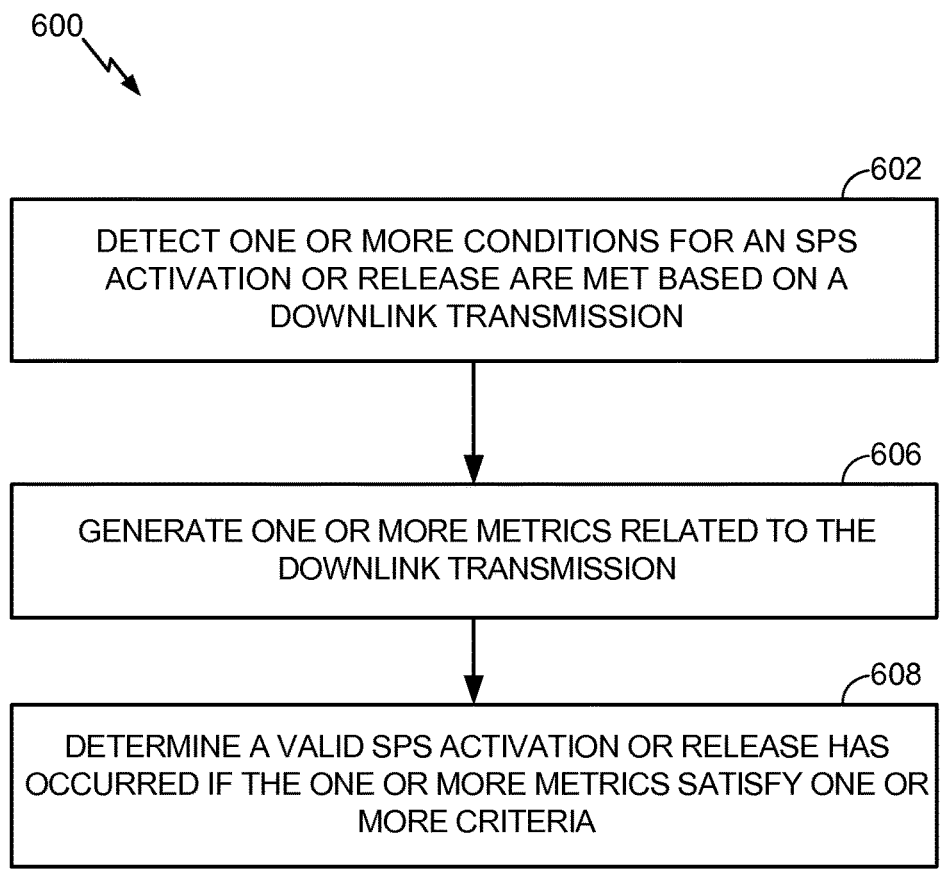
FIG. 6 illustrates example operations that may be performed by a user equipment, in accordance with certain aspects of the present disclosure.

FIG. 6 illustrates example operations 600 that may be performed by a UE (e.g., UE 120 and/or UE 520) to defend against false SPS release/activation detection, in accordance with aspects of the present disclosure. At 602, the UE detects one or more conditions for an SPS activation or release are met based on a downlink transmission. At 604, the UE generates one or more metrics related to downlink transmission. At 606, the UE determines a valid SPS activation or release has occurred if the one or more metrics satisfy one or more criteria.

Figure 7:
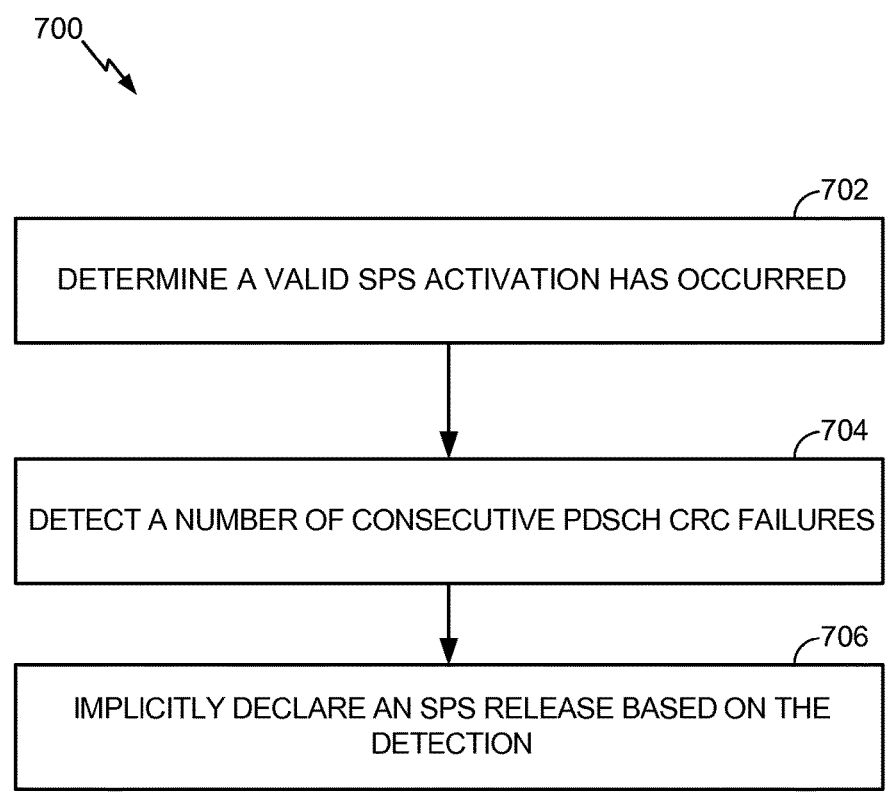
FIG. 7 illustrates example operations that may be performed by a user equipment, in accordance with certain aspects of the present disclosure.

FIG. 7 illustrates example operations 700 that may be performed by a UE (e.g., UE 120 and/or UE 520) to escape a condition caused by a false SPS activation or missed SPS release, in accordance with aspects of the present disclosure. At 702, the UE determines a valid SPS activation has occurred. At 704, the UE detects a number of consecutive PDSCH CRC failures. At 706, the UE implicitly declares an SPS release based on the detection.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for detecting, means for generating, means for determining, and means for declaring may comprise a receive processor 258 and/or the controller/processor 280 of the UE 120 illustrated in FIG. 2, and/or a receiver module 526 and/or the SPS activation/release detection module 524 illustrated in FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   detecting one or more conditions for a semi-persistent scheduling (SPS) activation or release are met based on a downlink transmission;
   generating one or more metrics related to the downlink transmission, wherein the one or more metrics comprise a decoding quality metric; and
   determining a valid SPS activation or release has occurred if the one or more metrics satisfy one or more criteria, wherein the one or more criteria comprise the decoding quality metric exceeding a threshold value.

2. The method of claim 1, wherein:
   the decoding quality metric is generated based on a physical downlink control channel (PDCCH) with a payload transmitted in a manner satisfying the one or more conditions.

3. The method of claim 1, wherein:
   the decoding quality metric is generated based on an SPS-Cell-Radio Network Temporary Identifier (C-RNTI) grant; and
   the threshold value is based on an decoding quality metric of another grant in a same subframe.

4. The method of claim 1, wherein the decoding quality metric comprises at least one of an LLR energy metric, a hamming distance, or some other metric that indicates an aggregate quality of a relation between decoded bits and input soft bits.

5. The method of claim 1, wherein the decoding quality metric provides an indication of a probability that the detected one or more conditions correspond to an SPS activation or release.

6. A method for wireless communications by a user equipment (UE), comprising:
   determining a valid semi-persistent scheduling (SPS) activation has occurred;
   detecting a number of Physical Downlink Shared Control Channel (PDSCH) Cyclic Redundancy Check (CRC) failures; and
   implicitly declaring an SPS release based on the detected number of PDSCH CRC failures.

7. The method of claim 6, wherein the detecting comprises detecting a number of consecutive PDSCH CRC failures.

8. The method of claim 6, wherein implicitly declaring the SPS release is also based on at least one of: a reference signal receive power (RSRP), reference signal receive quality (RSRQ), or a symbol error rate (SER).

9. The method of claim 6, wherein implicitly declaring the SPS release is based on at least one of a comparison between the RSRP and a Cell-Radio Network Temporary Identifier (C-RNTI) decode success rate or a comparison between the RSRQ and the C-RNTI decode success rate.

10. An apparatus for wireless communications by a user equipment (UE), comprising:
    at least one processor configured to:
    detect one or more conditions for a semi-persistent scheduling (SPS) activation or release are met based on a downlink transmission;
    generate one or more metrics related to the downlink transmission, wherein the one or more metrics comprise a decoding quality metric; and
    determine a valid SPS activation or release has occurred if the one or more metrics satisfy one or more criteria, wherein the one or more criteria comprise the decoding quality metric exceeding a threshold value; and
    a memory coupled with the at least one processor.

11. The apparatus of claim 10, wherein:
    the decoding quality metric is generated based on a physical downlink control channel (PDCCH) with a payload transmitted in a manner satisfying the one or more conditions.

12. The apparatus of claim 10, wherein:
    the decoding quality metric is generated based on an SPS-C-RNTI grant; and
    the threshold value is based on an decoding quality metric of another grant in a same subframe.

13. The apparatus of claim 10, wherein the decoding quality metric comprises at least one of an LLR energy metric, a hamming distance, or some other metric that indicates an aggregate quality of a relation between decoded bits and input soft bits.

14. The apparatus of claim 10, wherein the decoding quality metric provides an indication of a probability that the detected one or more conditions correspond to an SPS activation or release.

15. An apparatus for wireless communications by a user equipment (UE), comprising:
 at least one processor configured to:
  determine a valid semi-persistent scheduling (SPS) activation has occurred;
  detect a number of Physical Downlink Shared Control Channel (PDSCH) Cyclic Redundancy Check (CRC) failures; and
  implicitly declare an SPS release based on the detected number of PDSCH CRC failures; and
 a memory coupled with the at least one processor.

16. The apparatus of claim 15, wherein the detecting comprises detecting a number of consecutive PDSCH CRC failures.

17. The apparatus of claim 15, wherein the at least one processor is configured to implicitly declare the SPS release also based on at least one of: a reference signal receive power (RSRP), reference signal receive quality (RSRQ), or a symbol error rate (SER).

18. The apparatus of claim 15, wherein implicitly declaring the SPS release is based on at least one of a comparison between the RSRP and a Cell-Radio Network Temporary Identifier (C-RNTI) decode success rate or a comparison between the RSRQ and the C-RNTI decode success rate.

* * * * *